UNITED STATES PATENT OFFICE 3,365,460
METHOD OF SYNTHESIZING PYRIDOXINE-5'-PHOSPHATE
Masaharu Yoshikawa and Tetsuya Kato, Kanagawa-ken, and Tadao Takenishi, Tokyo, Japan, assignors to Ajinomoto Co., Inc., Tokyo, Japan
No Drawing. Filed Nov. 8, 1965, Ser. No. 506,890
Claims priority, application Japan, Nov. 13, 1964, 39/63,788
5 Claims. (Cl. 260—297)

The present invention relates to a method of synthesizing pyridoxine-5'-phosphate.

Pyridoxine-5'-phosphate has vitamin B6 efficiency and is useful as a food supplement.

Pyridoxine-5'-phosphate was produced heretofore by methods in which pyridoxine hydrochloride is phosphorylated with phosphoryl chloride in aqueous solution, and the pyridoxine-5'-phosphate is isolated as the calcium salt (D. Heyl et al., J. Am. Chem. Soc., 73, 3430, 1951), or in which isopropylidene pyridoxine is heated with the polyphosphate, and the isopropylidene pyridoxine phosphate formed is isolated as the barium salt (J. Baddilley et al., J. Chem. Soc., 1952, 2583). However, the yield of the known methods is too low (about 20%) to make them suitable for production of pyridoxine-5'-phosphate on an industrial scale.

We have found that pyridoxine-5'-phosphate can be obtained in very high yield by reacting 3,4'-O-isopropylidene pyridoxine with tetrachloro pyrophosphate and hydrolyzing the reaction product. The pyridoxine-5'-phosphate is obtained almost quantitatively when the reaction is carried out in the presence of a trialkyl phosphate.

3,4'-O-isopropylidene pyridoxine, the starting material of our method may be produced by reacting pyridoxine hydrochloride with acetone containing anhydrous hydrogen chloride, and then removing the hydrogen chloride with alkali (W. Korytynik and W. Wiedman; J. Chem. Soc., 1962, 2531).

Tetrachloro pyrophosphate (pyrophosphoryl chloride, $P_2O_3Cl_4$) may be obtained by heating a mixture of phosphorus pentoxide and phosphoryl chloride in a sealed tube (H. Grunze; Z. Anorg. Allgem. Chem., 296, 63 1958), or by heating monomethyl phosphoric dichloride with phosphoryl chloride (U.S. Patent No. 3,034,862). Tetrachloro pyrophosphate is used in an amount of 10 to 15 moles per mole of 3,4'-O-isopropylidene pyridoxine in the absence of trialkyl phosphate. One to two moles, preferably 1.2 moles, are sufficient in the presence of trialkyl phosphates.

Trialkyl phosphates are used in the present invention as solvents. The lower-alkyl phosphates, such as trimethyl phosphate, triethyl phosphates, tripropyl phosphate or tributyl phosphate are preferred. The trialkyl phosphate is generally used in a large excess, for example, in an amount of 10 to 30 milliliters per gram 3,4'-O-isopropylidene pyridoxine.

The reaction of the invention is carried out at a low temperature between −50° C. and 0° C., preferably between −30° C. and −5° C. At higher temperatures than 0° C. the yield is decreased by the formation of by-products and by the decomposition of the desired product.

The time required for completion of the reaction varies with the amount of reactants, the reaction temperature, and the presence or absence of solvent. It generally takes 1 to 6 hours in the absence of solvent, and 10 to 60 minutes in the presence of solvent.

In order to isolate the desired product synthesized, the reaction mixture is dissolved in water, trialkyl phosphate is removed by extraction, if necessary, and the isopropylidene group is removed by hydrolysis. Pyridoxine-5'-phosphate may be isolated as a metal salt from the hydrolized solution. The phosphate may also be isolated as the free ester by treating the hydrolysis mixture with an ion exchange resin.

The preparation of the starting material of the present invention is described below for convenience of reference although this is not part of the present invention.

A mixture of 12.0 g. pyridoxine hydrochloride and 250 g. acetone containing 35 g. anhydrous hydrogen chloride was kept overnight in an ice box and crystals of 3,4'-isopropylidene pyridoxine hydrochloride were formed. The crystals melted and decomposed at 203–204° C. The crystals were treated with potassium carbonate solution, and the crystals obtained from the treated solution were recrystallized from hot water. Crystalline 3,4'-O-isopropylidene pyridoxine which melted at 111–112° C. was obtained.

*Example 1*

2.0 g. 3,4'-isopropylidene pyridoxine was added to a mixture of 50 ml. triethylphosphate and 2.07 ml. tetrachloropyrophosphate prepared at a temperature below −20° C., and the reaction solution was stirred at −20° C. for 30 minutes. It was then poured into 300 ml. water, and the aqueous solution was shaken with 300 ml. benzene. The water layer was heated to 70° C. for one hour to remove the isopropylidene group. The yield of pyridoxine 5'-phosphate in the hydrolysis mixture was 99% as determined by paper chromatography using a mixture of n-propanol, concentrated ammonia and water (20:12:3, by volume). Hot saturated barium hydroxide solution was added, the pH was adjusted to 8, and the colorless crystals precipitated were removed by filtration and washed. One liter of filtrate and washings was passed through a column of 3.5 cm. diameter, 30 cm. length and packed with Diaion SKIA of hydrogen ion type (Diaion SKIA is the brand name of a cation exchange resin of strong sulfonic acid type, produced by Mitsubishi Kasei Co., Inc.). The fractions of the effluent having specific absorption in the ultra-violet were collected, and partly evaporated in a vacuum. The concentrated solution yielded pale brown, crystalline pyridoxine 5'-phosphate in an amount of 2.0 g., representing a yield of 70% based on the original 3,4'-O-isopropylidene pyridoxine. A single spot was formed in the paper chromatogram of the crystals, and the crystals were found to be 100% pure by ultra-violet absorption spectrography. The crude crystals were dissolved in a small amount of water, and reprecipitated by adding ethanol and ether. The refined crystals melted at 210–211° C., and identified by elementary analysis.

Calculated for $C_8H_{12}O_6NP$: C, 38.56; H, 4.85; N, 5.65; P, 12.43. Found: C, 38.54; H, 4.99; N, 5.59; P, 12.4.

Ultraviolet absorption spectra of the crystals in 0.1 N HCl solution and in 0.1 N NaOH solution were in agreement with those published (T. Kuroda, Vitamins 28, 211 (1963)) as shown below:

λ max, 292 mμ in 0.1 N HCl; λ max, 245, 310 mμ in 0.1 N NaOH.

The infrared absorption spectrum of the crystals showed absorption at 1286 cm.$^{-1}$, 1186 cm.$^{-1}$ and 1026 cm.$^{-1}$ due to phosphate as well as to the pyridoxine structure.

*Example 2*

0.5 g. 3,4'-O-isopropylidene pyridoxine was reacted with 0.45 ml. of tetrachloro pyrophosphate in the presence of 10 ml. trimethyl phosphate at −20° C. for 30 minutes. The reaction mixture was worked up as described in Example 1, and pyridoxine-5'-phosphate was produced in the yield of 98%.

When the trimethyl phosphate was replaced by 10 ml. tributyl phosphate, pyridoxine-5'-phosphate was produced in a yield of 80%.

Example 3

A mixture of 4.2 g. 3,4'-O-isopropylidene pyridoxine, 50 ml. triethyl phosphate and 4.3 ml. tetrachloro pyrophosphate was held at −20° C. for one hour. The reaction mixture was poured into water, the aqueous solution was extracted with benzene, and the water layer separated was heated to 70° C. for one hour. The pH of the solution obtained was adjusted to 4.5 with saturated barium hydroxide solution, the crystals precipitated were removed by filtration, and the combined filtrate and washings were adjusted with saturated barium hydroxide solution to pH 8.5. The solution was evaporated to about 70 ml. under reduced pressure, cooled, and the precipitate formed was collected by filtration. It was washed with a small amount of water and dried. 7.6 g. barium pyridoxine-5'-phosphate were obtained as a colorless powder.

A single spot was selected on a paper chromatogram of the powder.

Ultraviolet absorption spectra of the powder in acidic and alkaline solutions were in agreement with those published.

The purity of the powder was found to be 96% by ultraviolet absorption spectrum.

Example 4

Batches of 0.5 g. 3,4'-O-isopropylidene pyridoxine and 5 ml. of tetrachloro pyrophosphate were reacted at −10° C. and −20° C. for 1, 2, 3 and 6 hours. The reaction mixtures were worked up as in Example 1, and the amounts of pyridoxine-5'-phosphate, unreacted pyridoxine and other by-products were determined by paper chromatography.

The results obtained were as follows:

While the invention has been described with particular reference to specific embodiments, it is to be understood that it is not limited thereto but is to be construed broadly and restricted solely by the scope of the appended claims.

What we claim is:

1. A process of producing pyridoxine-5'-phosphate, which comprises reacting 3,4'-O-isopropylidene pyridoxine with tetrachloro pyrophosphate until 3,4'-O-isopropylidene-5'-phosphate is formed, and hydrolyzing said 3,4'-O-isopropylidene-5'-phosphate to remove the isopropylidene group.

2. A method as set forth in claim 1, wherein said 3,4'-O-isopropylidene pyridoxine is reacted with said tetrachloro pyrophosphate in the presence of a trialkyl phosphate as a solvent.

3. A method as set forth in claim 1, wherein said 3,4'-O-isopropylidene pyridoxine is mixed with said tetrachloro pyrophosphate, and the mixture is held at a temperature between −50° C. and 0° C. until said 3,4'-O-isopropylidene-5'-phosphate is formed.

4. A method as set forth in claim 3, wherein said mixture initially essentially consists of said 3,4'-O-isopropylidene pyridoxine and said tetrachloro pyrophosphate in a ratio of one mole of said 3,4'-O-isopropylidene pyridoxine to approximately 10–15 moles of said tetrachloro pyrophosphate.

5. A method as set forth in claim 3, wherein said mixture initially essentially consists of said 3,4'-O-isopropylidene pyridoxine and said tetrachloro pyrophosphate in a ratio of approximately one mole of said 3,4'-O-isopropylidene pyridoxine to approximately 1–2 moles of said tetrachloro pyrophosphate, and of an amount of tri-(lower)-alkyl phosphate sufficient to dissolve said 3,4'-O-isopropylidene pyridoxine and said tetrachloro pyrophosphate.

| Reaction time (hours) | Percentage | | | | | |
|---|---|---|---|---|---|---|
| | At −10° C. | | | At −20° C. | | |
| | PIN-5'-P | PIN | By-Product | PIN-5'-P | PIN | By-Product |
| 1 | 80 | 12 | 8 | 91 | 9 | Trace. |
| 2 | 87 | 7 | 6 | 89 | 11 | Do. |
| 3 | 90 | 10 | (¹) | | | |
| 6 | 88 | 10 | (¹) | 95 | 4 | Do. |

¹ Trace.

Note: PIN-5'-P=pyridoxine-5'-phosphate. PIN=pyridoxine.

References Cited

UNITED STATES PATENTS 2,755,284   7/1956   Long _____ 260—297

OTHER REFERENCES

Heyl et al., J. Am. Chem. Soc., vol. 73, pp. 3430–33, (1951).

Badilley, J. Chem. Soc., London, pp. 2583–91 (1952).

JOHN D. RANDOLPH, *Primary Examiner.*

ALAN L. ROTHMAN, *Assistant Examiner.*